(12) United States Patent
Duggal et al.

(10) Patent No.: US 10,176,496 B2
(45) Date of Patent: Jan. 8, 2019

(54) AUDIENCE SEGMENTATION BASED ON VIEWING ANGLE OF A USER VIEWING A VIDEO OF A MULTI-ANGLE VIEWING ENVIRONMENT

(71) Applicant: Adobe Inc., San Jose, CA (US)

(72) Inventors: Ashish Duggal, Delhi (IN); Niraj Gupta, Haryana (IN); Piyush Gupta, Pradesh (IN); Raman Gupta, Haryana (IN)

(73) Assignee: Adobe Inc., San Jose, CA (US)

( * ) Notice: Subject to any disclaimer, the term of this patent is extended or adjusted under 35 U.S.C. 154(b) by 222 days.

(21) Appl. No.: 15/193,183

(22) Filed: Jun. 27, 2016

(65) Prior Publication Data
US 2017/0372360 A1  Dec. 28, 2017

(51) Int. Cl.
G06Q 30/02 (2012.01)
H04N 13/282 (2018.01)
H04N 13/368 (2018.01)
G11B 27/00 (2006.01)

(52) U.S. Cl.
CPC ......... G06Q 30/0255 (2013.01); G11B 27/00 (2013.01); H04N 13/282 (2018.05); H04N 13/368 (2018.05)

(58) Field of Classification Search
CPC .... G06Q 30/0255; G06T 19/006; G06F 3/012
USPC .......................................................... 386/200
See application file for complete search history.

(56) References Cited

U.S. PATENT DOCUMENTS

| 2011/0191151 A1* | 8/2011 | Rosa | G06Q 30/02 705/14.1 |
| 2016/0322078 A1* | 11/2016 | Bose | G11B 27/031 |
| 2017/0264920 A1* | 9/2017 | Mickelsen | G06K 9/00335 |

* cited by examiner

Primary Examiner — Thai Q Tran
Assistant Examiner — Jose M Mesa
(74) Attorney, Agent, or Firm — Finch & Maloney PLLC

(57) ABSTRACT

Audience segmentation can be based on a viewing angle of a user viewing a video of a multi-angle viewing environment. During playback, a sequence of the user-controlled viewing angles of the video are recorded. The sequence represents the viewing angle of the user at a given point in time. Based on the sequences of several users, a predominant sequence of viewing angles of the video is determined. One or more audience segment tags are assigned to the predominant sequence of viewing angles. During subsequent playbacks of the video, the sequence(s) of user-controlled viewing angles of the video are recorded. The recorded sequence(s) of the subsequent user(s) are compared to the predominant sequence of viewing angles of the video, and the subsequent user(s) are assigned to an audience segment based on the comparison and the corresponding audience segment tags.

20 Claims, 7 Drawing Sheets

AUDIENCE SEGMENTATION BASED ON VIEWING ANGLE OF A USER VIEWING A VIDEO OF A MULTI-ANGLE VIEWING ENVIRONMENT

FIELD OF THE DISCLOSURE

This disclosure relates generally to the field of video processing, and more particularly, to techniques for audience segmentation based on a viewing angle of a user viewing a video of a multi-angle viewing environment, such as a 360 degree video.

BACKGROUND

Audience segmentation is a process of dividing people—typically consumers—into homogeneous groups based upon a pre-defined criterion. For instance, advertisers may use audience segmentation to design and tailor products and services for consumers based on information obtained from the consumers. In some cases, certain groups of consumers are assumed to have similar interests, needs and behavioral patterns that are suited for a particular product or service. This assumption allows marketers to design relevant messages that may influence those consumers to purchase or use the product or service with a higher success or conversion rate than other consumers not having the same interests, needs or behavioral patterns.

A relatively new product of interest to advertisers is 360 degree video, which is a form of video that enables a viewer to view a scene from different angles of the viewer's choosing. For instance, in a 360 degree video recorded from the center of a performance stage, the viewer may choose to look forward toward the center of the stage, to either side of the stage, or to the rear of the camera position toward the audience just as if he was turning the camera in the respective direction. This enables different viewers to look in different directions of interest to follow a particular character or object while watching the same video. 360 degree video can be viewed on a virtual reality (VR) device, a tablet, a smartphone or a personal computer application. In such applications, the user controls the viewing angle in any one of several ways, such as by movement of the VR device (worn on the user's head), by swiping or tilting a tablet or smartphone, or by using a mouse and keyboard on a personal computer. Presently, there are no known techniques for audience segmentation based on the viewing interests of users watching a 360 degree video. Therefore, improved audience segmentation techniques are desirable to capture user preferences at a greater level of detail than with existing techniques.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
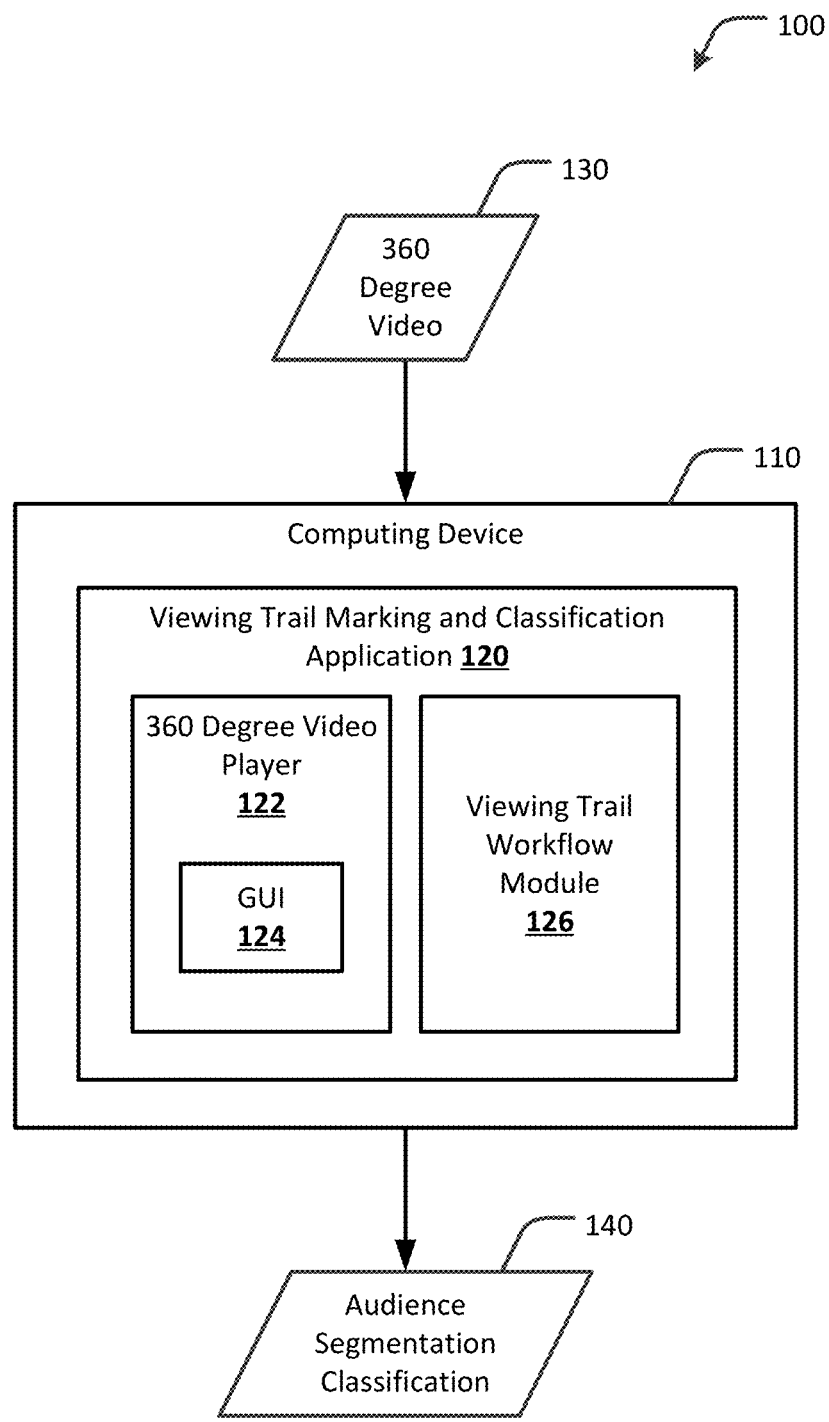
FIG. 1 shows an example system for audience segmentation based on a viewing angle of a user viewing a video of a multi-angle viewing environment, in accordance with an embodiment of the present disclosure.

In accordance with an embodiment of the present disclosure, techniques are disclosed for audience segmentation based on a viewing angle of a user viewing a video of a multi-angle viewing environment (e.g., a 360 degree video or any video that provides for more than one user-selectable viewing angle). A video of a multi-angle viewing environment is received and played back by a computing device for one or more users. The computing device may, for example, include or otherwise be in communication with a VR device designed to be worn on a user's head, a tablet or smartphone having a touch-sensitive screen or control pad, or a personal computer having a keyboard and mouse. During video playback, each user controls the viewing angle of the video with, for example, the VR device, the touch-sensitive screen, or the keyboard and mouse, depending on the type of device the user is operating. The computing device records a sequence of the user-controlled viewing angles of the video over a particular period or periods of time during playback of the video. The sequence represents a so-called viewing angle trail representing the viewing angle of the user at different points in time with respect to the playback. The sequence may, for example, be generated by a user who is a consumer, a publisher, a marketer or a content creator. Based on the sequences, or trails, of one or more users (typically multiple users), the computing device determines a predominant sequence of viewing angles of the video for those users. In this sense, the predominant sequence of viewing angles of the video represents the trails that occur most frequently among all of the trails recorded by the computing device. In one embodiment, the predominant sequence of viewing angles of the video results from a k-means clustering of the trails. One or more audience segment tags are assigned to the predominant sequence of viewing angles. The audience segment tags represent one or more audience segments (e.g., groups of users) as defined by, for example, an advertiser, publisher, content creator, or other entity. The tags may, for example, be assigned manually by an advertiser, publisher or content creator, or the tags may be assigned automatically using computer learning techniques.

During subsequent playbacks of the same video to other users (e.g., consumers or other users who are generally not publishers, marketers or content creators), the computing device again records the sequence of user-controlled viewing angles of the video over the same period or periods of time. The computing device compares the sequence(s), or viewing angle trail(s), of the subsequent user(s) to the predominant sequence of viewing angles of the video that has a period of time coincident with the viewing angle trail(s), and assigns the subsequent user(s) to an audience segment based on the comparison and the audience segment tags assigned to the predominant sequence of viewing angles. In this manner, users can be assigned to various audience segments (e.g., for targeted marketing purposes) based on the different ways the users view the video, reflecting the varying interests of those users.

For instance, consider an example of a 360 degree video featuring two characters. In this example, marketers, content creators or publishers can associate certain traits or attributes with users who predominantly view the first character and other traits or attributes with users who predominantly view the second character. These traits or attributes can be attached to different objects (e.g., the characters) within the 360 degree video by tagging viewing trails that relate to those objects with values that represent particular audience segments. For instance, if the first character in the 360 degree video is a piano player and the second character in the video is a violin player, a marketer may tag the predominant viewing trail that is directed toward the piano player with a "piano" attribute, and tag the predominant viewing trail that is directed toward the violin player with a "violin" attribute. Subsequently, users who produce viewing trails directed toward the piano player can be classified with an audience segment associated with the "piano" attribute (e.g., to generate marketing materials directed toward people who are interested in piano music). Similarly, users who produce viewing trails directed toward the violin player can be classified with another audience segment associated with the "violin" attribute (e.g., to generate marketing materials directed toward people who are interested in violin music).

Multi-angle video provides a powerful mechanism for defining new audience segments and identifying users who belong to these audience segments. Unlike traditional videos, multi-angle videos can be viewed from various angles such that different users can watch different portions of same video as they individually explore viewpoints that are most interesting to them. By capturing the viewing trails as variously disclosed herein, marketers and content creators have a greater ability to identify the user's interest levels and behavior. This additional information assists marketers and content creators to classify users into audience segments with greater specificity. For instance, a marketer or content creator can mark the parts of the video with metadata that identifies one or more interesting viewing angle trails. Each such viewing trail can be associated with a particular audience segment. Next, the video player can monitor the user's viewing angle for the marked time period, determine if the viewing angle overlaps for a significant time-duration with any trail provided in the metadata, and provide this information to the marketer or content creator for classification. Once users are classified into one or more audience segments based on their viewing trails, marketers, content creators and publishers can direct targeted marketing communications toward those users. The targeted marketing communications may, for example, include advertising or other information that can be tailored to appeal to users in a particular audience segment, which increases the probability that those users will respond favorably to such communications, thereby improving the effectiveness of a marketing campaign. Numerous configurations and variations will be apparent in light of this disclosure.

Example Methodology

FIG. 1 shows an example system 100 for audience segmentation based on a viewing angle of a user viewing a video of a multi-angle viewing environment, in accordance with an embodiment of the present disclosure. The system 100 includes a computing device 110 having one or more processors configured to execute a viewing trail marking and classification application 120. The application 120 includes a multi-angle (e.g., 360 degree) video player 122 and a viewing trail workflow module 124, each of which is executable, controllable, or both, by one or more processors of the computing device 110. The video player 122 may include a graphical user interface (GUI) 124 for playing back or otherwise displaying a multi-angle video to a user and for receiving user inputs to control, among other things, the viewing angle of the video.

The application 120 is configured to receive video data 130 and to generate audience segmentation classification data 140. The video data 130 represents a panoramic video recording, where the view in several different directions is recorded at the same time using a camera with a 360-degree (or other range) field of view or using multiple cameras recording different fields of view. Further, the video data 130 represents a multi-frame video that provides user-controlled viewing angles of the frames, such that the user can virtually select and change the viewing direction within the video player 122. The user-controlled viewing angles may, for example, include a sequence of viewing angles of the video over a fixed period of time relative to the playback (e.g., a sequence of viewing angles of the video during playback from 0 minutes, 30 seconds through 1 minute, 45 seconds from the start of the video). The viewing trail workflow module 126 is configured to receive, via the video player 122, the user-controlled viewing angles of the video 130 during playback. In response to receiving one or more sequences of user-controlled viewing angles of the video, the viewing trail workflow module 126 is further configured to determine a predominant sequence of viewing angles of the video, assign the user to an audience segment, or both, based at least in part on the sequences. Although FIG. 1 depicts a single computing device 110, it will be understood that, in some embodiments, portions of the processing performed by the viewing trail marking and classification application 120 can be distributed among multiple computing devices (e.g., a back-end server may be configured to perform the viewing trail classification workflow, such as described in further detail below).

A 360 degree video, a multi-angle video, and a video of a multi-angled viewing environment, as variously referred to in this disclosure, is a video that enables a user to control the three-dimensional angle at which the video is viewed. For example, a user may control a left-right viewing angle (e.g., an angle $\varphi$ along an x-y plane), an up-down viewing angle (e.g., $\theta$ along a z-axis), or both, which changes the perspective seen by the user within the multi-angle viewing environment captured by a video camera. Such changes in the viewing perspective simulate the actual perspective that the user would see by moving his or her head to look around a real world environment centered at the location of the video camera. For example, while watching playback of a multi-angle video using a VR device, the user may move his head (or supply another input, such as a swipe on a touch screen or a click of a mouse) to change the viewing angle and follow a particular character or object in the video. In this manner, the user has the ability to control and vary the viewing experience to his or her liking and preference. Moreover, different users viewing the same video in this manner can look at different characters or objects within the same scenes and thus have different viewing experiences. It will be understood that a 360 degree video, as referred to in this disclosure, does not necessarily provide image frames in a complete 360 field of view. For example, a 360 degree video may only provide a portion (i.e., less than all) of the 360 degree environment surrounding the camera in any direction due to application-specific limitations in the operation of the camera (e.g., camera mount blocking view) or when the videographer intentionally limits the field of view to capture specific characters or objects in the scene.

Figure 2:
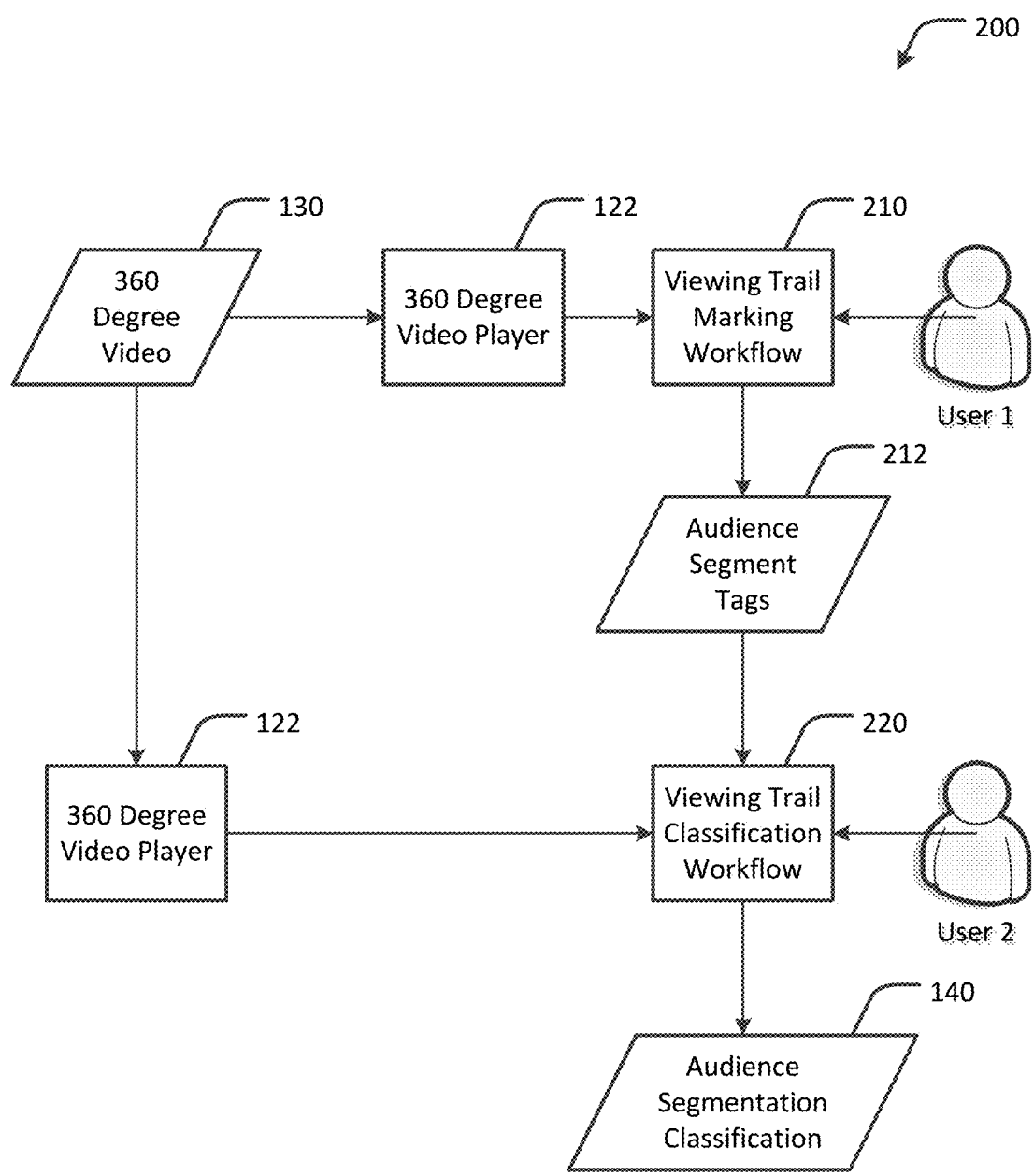
FIG. 2 shows an example data flow diagram for audience segmentation based on a viewing angle of a user viewing a video of a multi-angle viewing environment, in accordance with an embodiment of the present disclosure.

FIG. 2 shows an example data flow diagram 200 for audience segmentation based on a viewing angle of a user viewing a multi-angle video, in accordance with an embodiment of the present disclosure. The video 130 is received by the video player 122 and fed into the viewing trail marking workflow 210, the viewing trail classification workflow 220, or both. The viewing trail marking workflow 210, as described in further detail below, is performed using the video 130 and generally prior to execution of the viewing trail classification workflow 220. The viewing trail marking workflow 210 generally includes generating or identifying a predominant viewing trail of one or more users (e.g., User 1 may include one or more users) who generate one or more sequences of user-controlled viewing angles of the video 130 associated with all or a portion of the video 130. The viewing trail marking workflow further generally includes assigning one or more audience segment tags 212 to the predominant viewing trail.

The viewing trail classification workflow 220, as described in further detail below, generally includes observing a viewing trail of one or more users viewing the video (e.g., User 2 may include one or more users) who generate one or more sequences of user-controlled viewing angles of the video 130. The viewing trail classification workflow 220 further generally includes classifying the user(s) into one or more audience segments 140 based on a comparison between the observed viewing trail of the user(s) and the predominant viewing trail or trails of the video.

Figure 3A:
FIGS. 3A and 3B show two examples of a video of a multi-angle viewing environment at a single point in time as seen from two different viewing angles, respectively, in accordance with an embodiment of the present disclosure.
Figure 3B:
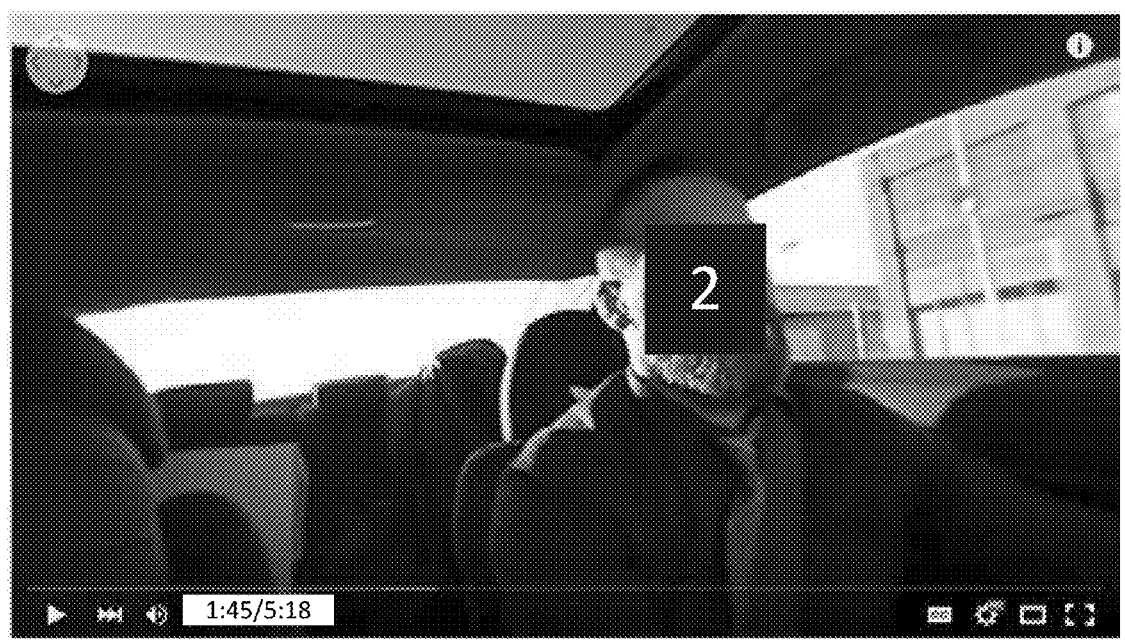

FIGS. 3A and 3B show two examples of a multi-angle video at a single point in time as seen from two different viewing angles, respectively, in accordance with an embodiment of the present disclosure. In this example, the video camera, mounted on the dashboard of an automobile, records a video in multiple directions at the same time. During playback of the video, a user can change the viewing angle of the video so as to look in different directions of the user's choosing. Such playback and control may be implemented, for example, by the GUI 124 of FIG. 1. In FIG. 3A, one user is looking at a character (character "1") sitting in the passenger seat of an automobile at a given point of time in the video (e.g., at the 1 minute, 45 second mark). In FIG. 3B, another user is looking at another character (character "2") sitting in the driver seat of the automobile at the same point in time (e.g., at the 1 minute, 45 second mark). Hence, different users can look at different characters or objects by changing the viewing angle using, for example, a head-mounted VR device, a touch-sensitive tablet screen, or a mouse and keyboard.

As the video is played back, the user inputs that control the different viewing angles of the video can be recorded as a function of time so as to generate a so-called viewing trail. The viewing trail represents a time-based sequence of viewing angles of the video by a given user. The viewing trail may represent all or a portion of video. For example, the video may be segmented into several scenes based on time (e.g., a first scene between 0:00 and 0:30, a second scene between 1:45 and 3:50, etc.), and a viewing trail may be associated with one of those scenes.

Figure 4:
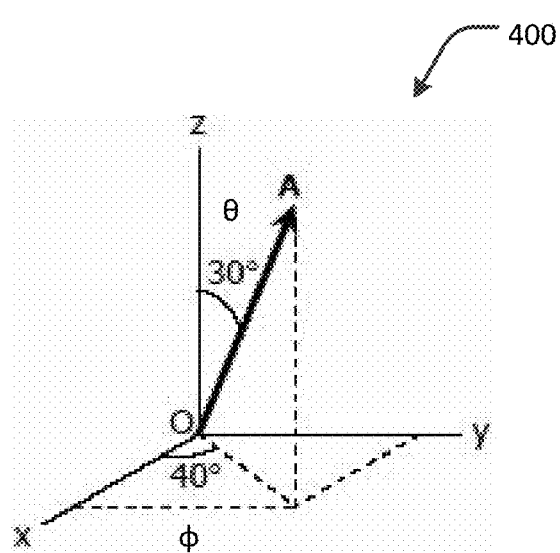
FIG. 4 shows an example coordinate system, in accordance with an embodiment of the present disclosure.

In Tables 1A and 1B below, $(\varphi,\theta)$ represents a viewing angle in a first plane (e.g., an x-y plane) and in a second plane that is orthogonal to the first plane (e.g., an x-z plane), such as shown in the example coordinate system 400 of FIG. 4. In FIG. 4, the vector A represents the viewing angle from origin O within the video. Note that in the coordinate system 400, the viewing angle $(\varphi,\theta)$ can be zero, positive or negative in any dimension.

TABLE 1A

User Viewing Angle Trail 1

| Video Time | Viewing Angle Trail (in degrees) | |
|---|---|---|
| (minute:second.millisecond) | φ | θ |
| 3:00.000 | 10 | 20 |
| 3:00.500 | 11 | 21 |
| 3:01.000 | 11 | 22 |
| 3:01.500 | 12 | 22 |
| ... | ... | |
| 3:58.500 | 10 | 21 |
| 3:59.000 | 12 | 22 |
| 3:59.500 | 11 | 21 |

TABLE 1B

User Viewing Angle Trail 2

| Video Time | Viewing Angle Trail (in degrees) | |
|---|---|---|
| (minute:second.millisecond) | φ | θ |
| 3:00.000 | 90 | 40 |
| 3:00.500 | 92 | 41 |
| 3:01.000 | 93.5 | 41 |
| 3:01.500 | 95 | 41 |
| ... | ... | |
| 3:58.500 | 101 | 39 |
| 3:59.000 | 102 | 39 |
| 3:59.500 | 102 | 40 |

For a given user, there can be multiple viewing trails for a given video, for example, separate viewing trails for different scenes within the video, or separate viewing trails for the same scenes over multiple playbacks of the video. Since the viewing trail is user-controlled, each user may generate a different and unique viewing trail while watching the same scenes in the same video. For example, in a video that features two characters, one group of users may control the viewing angle so as to look toward the first character, while another group of users may control the viewing angle so as to look toward the second character, depending on which character is of more interest to the users in each group. However, it is possible that users in a particular group who have similar interests will also have substantially similar, although not necessarily identical, viewing trails.

Information about users viewing a particular multi-angle video, or several multi-angle videos, can be obtained from the viewing trails of those users. Unlike conventional videos, users can control the viewing angle of a multi-angle video, so that different users may watch different portions of same video at the same point in time during video playback and therefore have different viewing experiences. Users thus have more flexibility while watching the videos as now they can explore and watch those video areas which they find more interesting by changing the viewing angle. In turn, marketers and content creators can have more control over identifying the user's interest levels and behavior by following the user's viewing trail of a video. This information can help marketers and content creators to classify the users into particular audience segments.

Initially, a publisher, marketer or content creator can mark parts of the video with metadata that identifies one or more viewing angle trails of interest and one or more audience segments associated with those parts of the video. Each such viewing trail is then associated with one or more audience segments. Next, a video player records the user's viewing angle for the marked time period and determines whether the user's viewing angle overlaps with any trail provided in the metadata. If there is an overlap, the user can be assigned to the audience segment(s) corresponding to the predominant viewing trail.

According to an embodiment, a computer-implemented method for audience segmentation based on a viewing angle of a user viewing a multi-angle video includes one or more workflows, including, for instance, the viewing trail marking workflow 210 and the viewing trail classification workflow 220 of FIG. 2. The viewing trail marking workflow 210 is generally performed on a new video before the viewing trail classification workflow. The viewing trail marking workflow 210 generally includes generating or identifying a predominant viewing trail associated with all or a portion of a given video. The viewing trail classification workflow generally includes observing a viewing trail of a user viewing the video and classifying the user into one or more audience segments based on a comparison between the observed viewing trail of that user and the predominant viewing trail or trails of the video.

Figure 5:
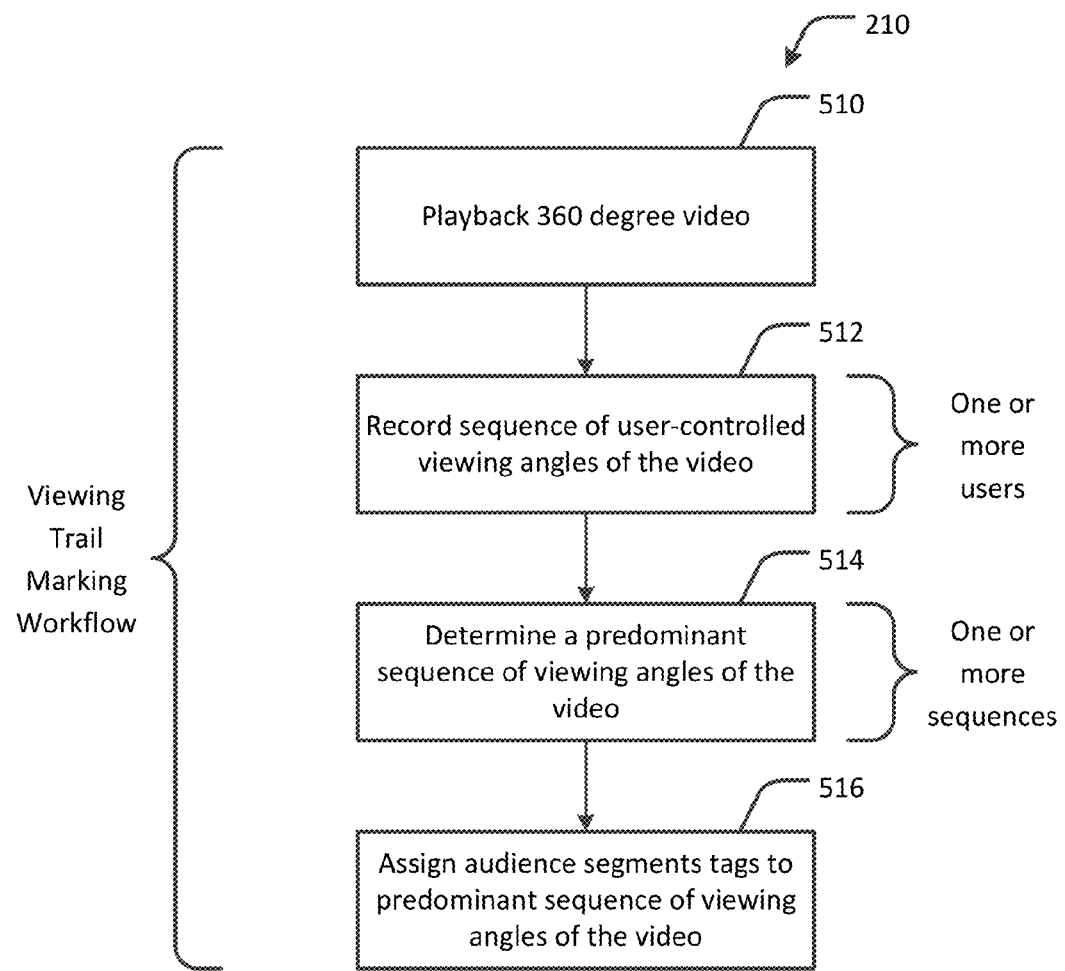
FIG. 5 shows an example viewing trail marking workflow, in accordance with an embodiment of the present disclosure.

FIG. 5 shows, in further detail, the viewing trail marking workflow 210 of FIG. 2, according to an embodiment. The viewing trail marking workflow 210 includes playing back 510 the video 130 to one or more users using, for example, the video player 122 of FIG. 1. Next, the viewing trail or trails of one or more users viewing the video are recorded 512. Based on the recorded viewing trail or trails, the predominant viewing trail is determined 514. Where there is only one viewing trail, the predominant viewing trail may be the same as the viewing trail of the user. For example, in the case of a single user, the viewing trail marking workflow may include playing back a video of a multi-angle viewing environment to a first user, recording a first sequence of user-controlled viewing angles of the video over a fixed period of time during a first playback of the video to the first user, determining a predominant sequence of viewing angles of the video based on the first sequence of user-controlled viewing angles of the video, and assigning one or more audience segment tags to the predominant sequence of viewing angles. In this case, the predominant viewing trail for the video, or a portion of the video, is the same as the first sequence of user-controlled viewing angles of the video. Where there are multiple viewing trails, the viewing trail marking workflow may further include recording 512 a second sequence of user-controller viewing angles of the video during a second playback of the video to a second user over an overlapping period of time as the first sequence of user-controlled viewing angles of the video. In this case, the predominant sequence of viewing angles of the video is further based on the second sequence of user-controlled viewing angles of the video, such as described in further detail below. It will be understood that any number of users or sequences of user-controlled viewing angles of the video may be used to determine the predominant sequence of viewing angles of the video, and further that the value of, or confidence in, this information may increase as a function of the number of users and sequences of user-controlled viewing angles of the video increases. In some embodiments, the one or more audience segment tags can be assigned to the predominant sequence of viewing angles either manually by a user or automatically by a computer in accordance with a pre-defined assignment scheme.

In some embodiments, there can be one or more predominant sequences of viewing angles of the video. One or more audience segment tags can be assigned 516 to each of the predominant sequences of viewing angles of the video, such as shown in Tables 1A and 1B above, which may depict, for example, a 30 minute family drama video. Assigning an audience segment tag to a predominant sequence of viewing angles of the videos is considered tagging or marking the sequence to be associated with the respective audience segment. Note that not all sequences that are identified as predominant sequences, such as those obtained via clustering on multiple viewing trails, are necessarily tagged or marked. In this respect, for example, a publisher may elect to tag or mark some sequences but not others. In the above example, Table 1A represents a portion of a viewing angle trail (Viewing Angle Trail 1) that is assigned to audience segments "theist" and "mythological," and Table 1B represents a portion of a viewing angle trail (Viewing Angle Trail 2) that is assigned to audience segments "sports enthusiast," "fashionable," and "brand aware." It will be understood that assignment of a given viewing angle trail to any audience segment is at the discretion of the marketer, content creator or other entity responsible for assigning the relevant audience segment categories to the various predominant viewing trails of the multi-angle video.

In some cases, the individual sequences of user-controlled viewing angles of the video may not overlap or intersect with each other. For example, given 500 user-controlled sequences of viewing angles, it is likely that for a given point of time in during playback of the multi-angle video, at least some of the 500 user-controlled sequences of viewing angles will be different since different users (or even the same user over different playbacks) may move their heads in different ways to look at the same characters and objects. Thus, in some embodiments, the predominant sequence of viewing angles is determined by applying a clustering algorithm (e.g., k-means clustering) to a viewing angle of the first user in the first sequence of user-controlled viewing angles of the video at a first point in time and to a viewing angle of the second user in the second sequence of user-controlled viewing angles of the video at a second point in time. The first point in time may be the same as, or close to (e.g., within several seconds of) the second point in time. The clustering algorithm unifies the viewing angles of each sequence in the case where the individual sequences of user-controlled viewing angles of the video do not overlap or intersect with other such sequences, and can be used for clustering any number of sequences of user-controlled viewing angles of the video.

Alternatively a crowd-viewing technique can be employed to assist in identification of the several interesting viewing angle trails. To find trails within a given start-timestamp and end-time in the video timeline (e.g., start/end times specified by the publisher), one way could be using k-means clustering on the sub-trails, clipped for the given time period. A suitable value of k can be provided by the publisher or can be discovered algorithmically. In such cases, each trail includes a series of $(\varnothing, \theta)$ for a time period between (start, end) for e.g., every 0.5 seconds. For a fixed time=t, the distance between $(\varnothing 1, \theta 1)$ and $(\varnothing 2, \theta 2)$ will be the shortest radial distance on a unit sphere, given by Haversine Formula for radius=1. The distance between two viewing trails can be defined as the average of all such distances (as calculated by Haversine Formula) for different times.

Figure 6:
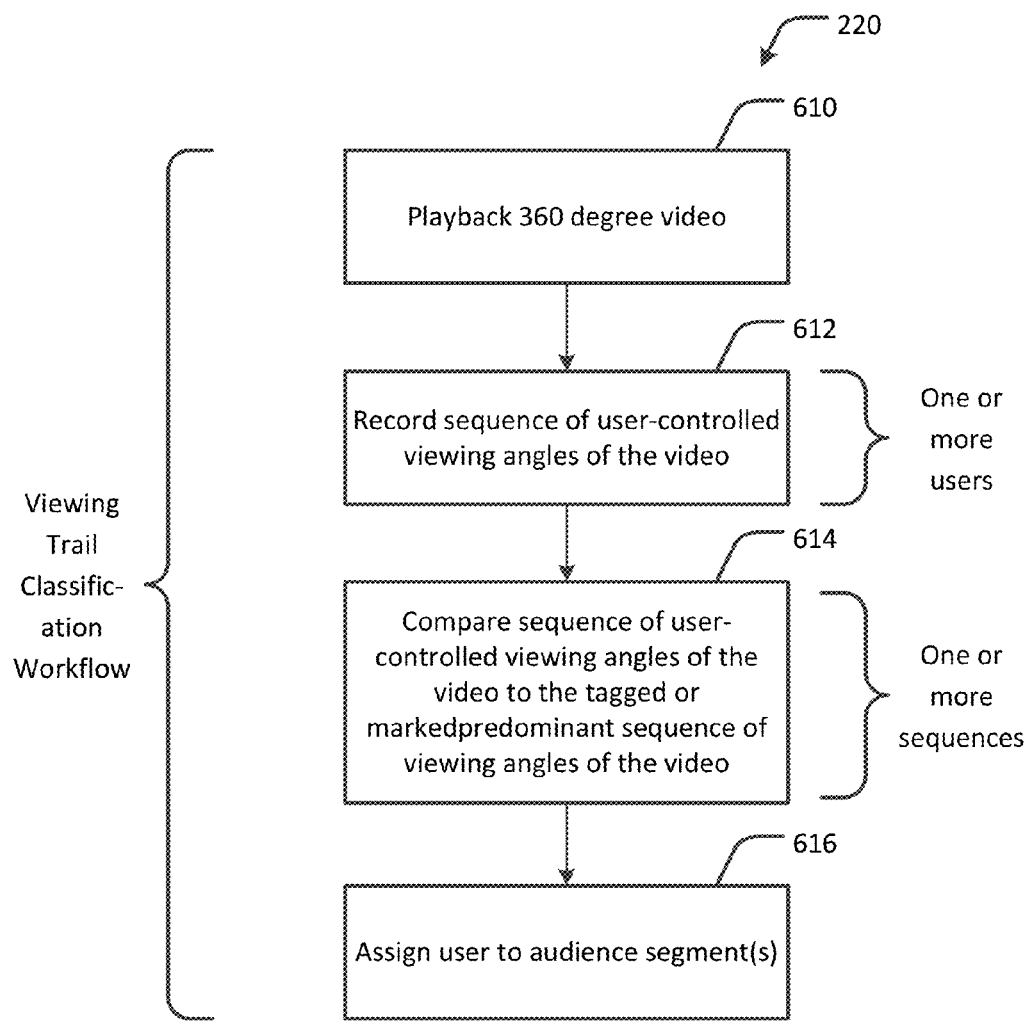
FIG. 6 shows an example viewing trail classification workflow, in accordance with an embodiment of the present disclosure.

FIG. 6 shows, in further detail, the viewing trail classification workflow 220 of FIG. 2, according to an embodiment. The viewing trail classification workflow 220 includes playing back 610 the video 130 to one or more users using, for example, the video player 122 of FIG. 1. The viewing trail classification workflow 220 further includes recording 612 or otherwise observing a sequence of user-controlled viewing angles of the video, or a portion of the video, by one or more users, and comparing 614 the observed sequence of user-controlled viewing angles of the video to the predominant sequence of viewing angles of the video that relates to the same period of time as the observed sequence of user-controlled viewing angles, such as obtained at 514 of FIG. 5. In some embodiments, the comparison is only performed on predominant sequences of viewing angles that are tagged or marked, as described above with respect to 516 of FIG. 5. For instance, at any time=t during video playback, a viewer may be looking at a viewing window rectangle whose bottom-left and top-rights coordinates are are (ø, θ) and (ø+Δø, θ+Δθ), respectively, where Δø is half of the width and Δθ is half the height of the viewing window in radians. If the viewing angle, of the viewing trail, lies in this window, then by comparison the observed viewing angle is considered to overlap with the predominant view angle of the video at that particular point in time. Alternatively, an overlap can be determined based on the reduced window size (e.g., 50% of the original view-window size), so that the character or object of interest is near the center of the view. When such overlaps are found, then, the user is assigned 616 to an audience segment based on the comparison and the one or more audience segment tags assigned to the predominant sequence of viewing angles during the viewing trail marking workflow 210, such as described above. For example, where the observed sequence of user-controlled viewing angles of the video matches one of the predominant sequence of viewing angles associated with "theist" and "mythological," the user is assigned to the audience segments "theist" and "mythological." Similarly, where the observed sequence of user-controlled viewing angles of the video matches one of the predominant sequence of viewing angles associated with "sports enthusiast," "fashionable," and "brand aware," the user is assigned to the audience segments "sports enthusiast," "fashionable," and "brand aware." In some cases, the comparison 614 includes determining a distance between the observed sequence of user-controlled viewing angles of the video and the predominant sequence of viewing angles of the video using a distance function, where the second user is assigned to the audience segment when the distance is less than a predetermined value. In some cases, the overlap may be determined when the number of times the overlap occurs exceeds a threshold within the duration of the marked trail.

Example Computing Device

Figure 7:
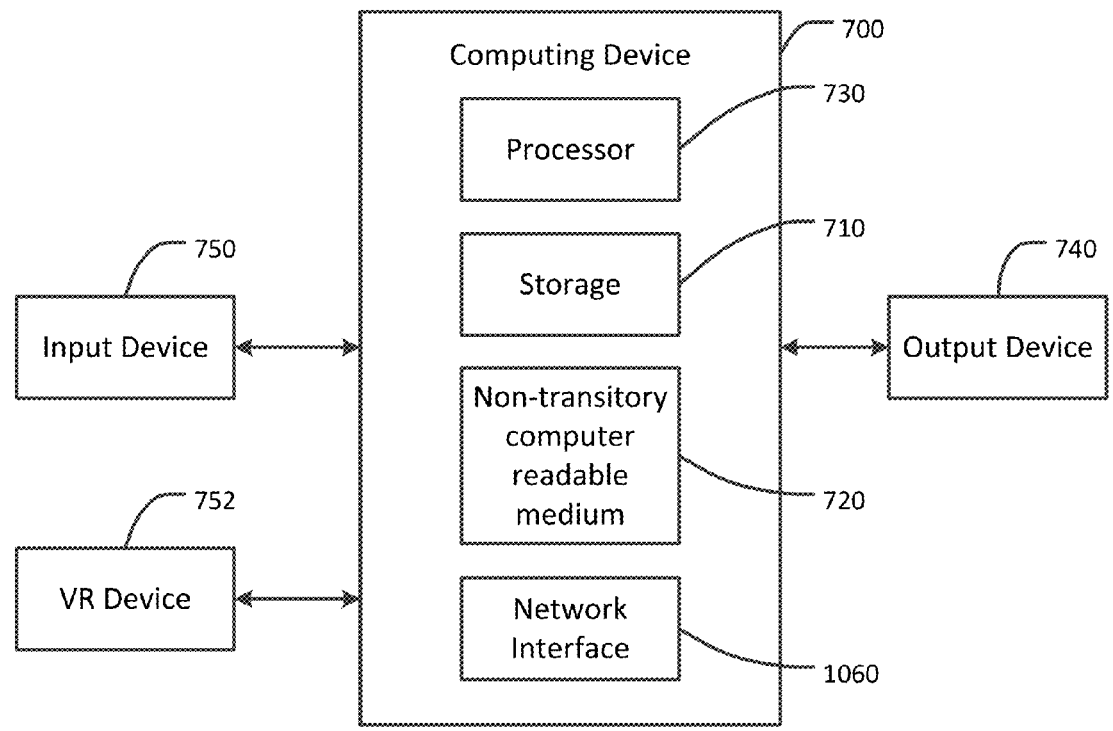
FIG. 7 is a block diagram representing an example computing device that may be used to perform any of the techniques as variously described in this disclosure.

FIG. 7 is a block diagram representing an example computing device 700 that may be used to perform any of the techniques as variously described in this disclosure. For example, the system 100 of FIG. 1, or any portions thereof, and the methodologies of FIGS. 5 and 6, or any portions thereof, may be implemented in the computing device 700. The computing device 700 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 700 includes one or more storage devices 710 and/or non-transitory computer-readable media 720 having encoded thereon one or more computer-executable instructions or software for implementing techniques as variously described in this disclosure. The storage devices 710 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 710 may include other types of memory as well, or combinations thereof. The storage device 710 may be provided on the computing device 700 or provided separately or remotely from the computing device 700. The non-transitory computer-readable media 720 may include, but are not limited to, one or more types of hardware memory, non-transitory tangible media (for example, one or more magnetic storage disks, one or more optical disks, one or more USB flash drives), and the like. The non-transitory computer-readable media 720 included in the computing device 700 may store computer-readable and computer-executable instructions or software for implementing various embodiments. The computer-readable media 720 may be provided on the computing device 700 or provided separately or remotely from the computing device 700.

The computing device 700 also includes at least one processor 730 for executing computer-readable and computer-executable instructions or software stored in the storage device 710 and/or non-transitory computer-readable media 720 and other programs for controlling system hardware. Virtualization may be employed in the computing device 700 so that infrastructure and resources in the computing device 700 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 700 through an output device 740, such as a screen or monitor, which may display one or more user interfaces provided in accordance with some embodiments. The output device 740 may also display other aspects, elements and/or information or data associated with some embodiments. The computing device 700 may include other I/O devices 750 for receiving input from a user, for example, a keyboard, a joystick, a game controller, a pointing device (e.g., a mouse, a user's finger interfacing directly with a touch-sensitive display device, etc.), or any suitable user interface. The computing device 700 may include other suitable conventional I/O peripherals, such as a VR device 752 designed to be worn on a user's head for viewing a multi-angle video and for controlling the viewing angle of the video. The computing device 700 can include and/or be operatively coupled to various suitable devices for performing one or more of the aspects as variously described in this disclosure.

The computing device 700 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 700 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the viewing trail marking and classification application 120, the video player 122, the graphical user interface 124, the viewing trail workflow module 126, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 700, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of audience segmentation. The method includes playing back a video of a multi-angle viewing environment (e.g., a 360 degree viewing environment or another multi-angle range) to a first user; recording, during a first playback of the video to the first user, a first sequence of user-controlled viewing angles of the video over a fixed period of time; determining a predominant sequence of viewing angles of the video based on the first sequence of user-controlled viewing angles of the video the predominant sequence of viewing angles representing at least a subset of the first sequence of user-controller viewing angles of the video; and assigning one or more audience segment tags to the predominant sequence of viewing angles, each of the one or more audience segment tags representing a group of users including the first user. In some cases, the multi-angle viewing environment is a 360 degree viewing environment. In some cases, the video includes at least two different user-selectable viewing angles of a scene. In some cases, each of the one or more audience segment tags represents a group (audience segment) of users including the first user. In some cases, the method includes recording, during a second playback of the video to a second user, a second sequence of user-controller viewing angles of the video over an overlapping period of time as the first sequence of user-controlled viewing angles of the video. In some such cases, the determining of the predominant sequence of viewing angles of the video is further based on the second sequence of user-controlled viewing angles of the video. In some such cases, the determining of the predominant sequence of viewing angles includes: applying a clustering algorithm to a viewing angle of the first user in the first sequence of user-controlled viewing angles of the video at a first point in time and to a viewing angle of the second user in the second sequence of user-controlled viewing angles of the video at a second point in time, where the clustering algorithm generates the predominant sequence of viewing angles. In some such cases, the first point in time is the same as the second point in time. In some cases, the method includes comparing the second sequence of user-controlled viewing angles of the video to the predominant sequence of viewing angles of the video. In some such cases, the method includes assigning the second user to an audience segment based on the comparison and the one or more audience segment tags assigned to the predominant sequence of viewing angles. In some other such cases, the comparison includes determining a distance between the second sequence of user-controlled viewing angles of the video and the predominant sequence of viewing angles of the video using a distance function, where the second user is assigned to the audience segment when the distance is less than a predetermined value.

Another example embodiment provides a digital medium environment for processing video, including a system for audience segmentation. The system includes a storage and a processor operatively coupled to the storage. The processor is configured to execute instructions stored in the storage that when executed cause the processor to carry out a process including playing back a video of a multi-angle viewing environment to a first user; recording, during a first playback of the video to the first user, a first sequence of user-controlled viewing angles of the video over a fixed period of time; determining a predominant sequence of viewing angles of the video based on the first sequence of user-controlled viewing angles of the video the predominant sequence of viewing angles representing at least a subset of the first sequence of user-controller viewing angles of the video; and assigning one or more audience segment tags to the predominant sequence of viewing angles, each of the one or more audience segment tags representing a group of users including the first user. In some cases, the multi-angle viewing environment is a 360 degree viewing environment. In some cases, the video includes at least two different user-selectable viewing angles of a scene. In some cases, each of the one or more audience segment tags represents a group (audience segment) of users including the first user. In some cases, the process includes recording, during a second playback of the video to a second user, a second sequence of user-controller viewing angles of the video over an overlapping period of time as the first sequence of user-controlled viewing angles of the video. In some such cases, the determining of the predominant sequence of viewing angles of the video is further based on the second sequence of user-controlled viewing angles of the video. In some such cases, the determining of the predominant sequence of viewing angles includes: applying a clustering algorithm to a viewing angle of the first user in the first sequence of user-controlled viewing angles of the video at a first point in time and to a viewing angle of the second user in the second sequence of user-controlled viewing angles of the video at a second point in time, where the clustering algorithm generates the predominant sequence of viewing angles. In some such cases, the first point in time is the same as the second point in time. In some cases, the process includes comparing the second sequence of user-controlled viewing angles of the video to the predominant sequence of viewing angles of the video. In some such cases, the process includes assigning the second user to an audience segment based on the comparison and the one or more audience segment tags assigned to the predominant sequence of viewing angles. In some other such cases, the comparison includes determining a distance between the second sequence of user-controlled viewing angles of the video and the predominant sequence of viewing angles of the video using a distance function, where the second user is assigned to the audience segment when the distance is less than a predetermined value. Another example embodiment provides a non-transitory computer program product having instructions encoded thereon that when executed by one or more computer processors cause the one or more computer processors to perform a process such as set forth above.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of audience segmentation, the method comprising: playing back, by a computing device, a video of a multi-angle viewing environment to a first user; recording, by the computing device and during a first playback of the video to the first user, a first sequence of user-controlled viewing angles of the video over a fixed period of time; determining, by the computing device, a predominant sequence of viewing angles of the video based on the first sequence of user-controlled viewing angles of the video, the predominant sequence of viewing angles representing at least a subset of the first sequence of user-controller viewing angles of the video; assigning one or more audience segment tags to the predominant sequence of viewing angles, each of the one or more audience segment tags representing a group of users including the first user; and displaying, by the computing device, a marketing communication to a user in the group of users based at least in part on the one or more audience segment tags.

2. The method of claim 1, further comprising:
recording, by the computing device and during a second playback of the video to a second user, a second sequence of user-controller viewing angles of the video over an overlapping period of time as the first sequence of user-controlled viewing angles of the video.

3. The method of claim 2, wherein the determining of the predominant sequence of viewing angles of the video is further based on the second sequence of user-controlled viewing angles of the video.

4. The method of claim 3, wherein the determining of the predominant sequence of viewing angles includes:
applying, by the computing device, a clustering algorithm to a viewing angle of the first user in the first sequence of user-controlled viewing angles of the video at a first point in time and to a viewing angle of the second user in the second sequence of user-controlled viewing angles of the video at a second point in time, wherein the clustering algorithm generates the predominant sequence of viewing angles.

5. The method of claim 4, wherein the first point in time is the same as the second point in time.

6. The method of claim 2, further comprising:
comparing, by the computing device, the second sequence of user-controlled viewing angles of the video to the predominant sequence of viewing angles of the video.

7. The method of claim 6, further comprising assigning the second user to an audience segment based on the comparison and the one or more audience segment tags assigned to the predominant sequence of viewing angles.

8. The method of claim 6, wherein the comparison includes determining a distance between the second sequence of user-controlled viewing angles of the video and the predominant sequence of viewing angles of the video using a distance function, and wherein the second user is assigned to the audience segment when the distance is less than a predetermined value.

9. In a digital medium environment for processing video, a system for audience segmentation, the system comprising: a storage; and a processor operatively coupled to the storage, the processor configured to execute instructions stored in the storage that when executed cause the processor to carry out a process comprising: playing back a video of a multi-angle viewing environment to a first user; recording, during a first playback of the video to the first user, a first sequence of user-controlled viewing angles of the video over a fixed period of time; determining a predominant sequence of viewing angles of the video based on the first sequence of user-controlled viewing angles of the video the predominant sequence of viewing angles representing at least a subset of the first sequence of user-controller viewing angles of the video; assigning one or more audience segment tags to the predominant sequence of viewing angles, each of the one or more audience segment tags representing a group of users including the first user; and displaying, by the computing device, a marketing communication to a user in the group of users based at least in part on the one or more audience segment tags.

10. The system of claim 9, wherein the video includes at least two different user-selectable viewing angles of a scene.

11. The system of claim 9, wherein the process further comprises:
recording, during a second playback of the video to a second user, a second sequence of user-controller viewing angles of the video over an overlapping period of time as the first sequence of user-controlled viewing angles of the video.

12. The system of claim 11, wherein the determining of the predominant sequence of viewing angles of the video is further based on the second sequence of user-controlled viewing angles of the video.

13. The system of claim 12, wherein the determining of the predominant sequence of viewing angles includes:
applying a clustering algorithm to a viewing angle of the first user in the first sequence of user-controlled viewing angles of the video at a first point in time and to a viewing angle of the second user in the second sequence of user-controlled viewing angles of the video at a second point in time, wherein the clustering algorithm generates the predominant sequence of viewing angles.

14. The system of claim 11, wherein the process further comprises:
comparing the second sequence of user-controlled viewing angles of the video to the predominant sequence of viewing angles of the video.

15. The system of claim 14, wherein the process further comprises assigning the second user to an audience segment based on the comparison and the one or more audience segment tags assigned to the predominant sequence of viewing angles.

16. The system of claim 14, wherein the comparison includes determining a distance between the second sequence of user-controlled viewing angles of the video and the predominant sequence of viewing angles of the video using a distance function, and wherein the second user is assigned to the audience segment when the distance is less than a predetermined value.

17. A non-transitory computer program product having instructions encoded thereon that when executed by one or more computer processors cause the one or more computer processors to perform a process comprising: playing back a video of a multi-angle viewing environment to a first user; recording, during a first playback of the video to the first user, a first sequence of user-controlled viewing angles of the video over a fixed period of time; determining a predominant sequence of viewing angles of the video based on the first sequence of user-controlled viewing angles of the video the predominant sequence of viewing angles representing at least a subset of the first sequence of user-controller viewing angles of the video; assigning one or more audience segment tags to the predominant sequence of viewing angles, each of the one or more audience segment tags representing a group of users including the first user; and displaying, by the computing device, a marketing communication to a user in the group of users based at least in part on the one or more audience segment tags.

18. The non-transitory computer program product of claim 17, wherein the process further comprises:
recording, during a second playback of the video to a second user, a second sequence of user-controller viewing angles of the video over an overlapping period of time as the first sequence of user-controlled viewing angles of the video.

19. The non-transitory computer program product of claim 18, wherein the determining of the predominant sequence of viewing angles of the video is further based on the second sequence of user-controlled viewing angles of the video.

20. The non-transitory computer program product of claim 19, wherein the determining of the predominant sequence of viewing angles includes:
applying a clustering algorithm to a viewing angle of the first user in the first sequence of user-controlled viewing angles of the video at a first point in time and to a viewing angle of the second user in the second sequence of user-controlled viewing angles of the video at a second point in time, wherein the clustering algorithm generates the predominant sequence of viewing angles.

* * * * *